March 11, 1941.   S. ROSENBERG ET AL   2,234,877

CHAIN MANUFACTURE

Filed April 10, 1940

INVENTORS:
SAMUEL ROSENBERG, DECEASED, BY
GERTRUDE POUSMAN, ADMINISTRATRIX, AND
THOMAS ROSENBERG.

BY: Horace S Woodward
ATTORNEY.

UNITED STATES PATENT OFFICE 2,234,877

CHAIN MANUFACTURE

Samuel Rosenberg, deceased, late of New York, N. Y., by Gertrude Pousman, administratrix, New York, N. Y., and Thomas Rosenberg, New York, N. Y.

Application April 10, 1940, Serial No. 328,996

7 Claims. (Cl. 59—31)

This application is a continuation in part of the prior application of Samuel and Thomas Rosenberg, Serial No. 227,215, filed August 27, 1938, for Sliding sash suspension.

This invention relates to chain manufacture and more particularly to electrically welded chain described in the said application adapted to free running and other movements without impedance by the collar at the weld, and free in large measure from liability of entanglement, or kinking, especially when used in sash suspension.

It is an important object of the invention to present such a chain which may be produced by welding from stock steel wire rod with peculiar advantages in smooth performance of the chain in use, and in which a very high tensile strength will be available as compared to the strength of ordinary welded chain as heretofore produced.

It is a particular aim of the invention to present an electrically welded link chain peculiarly adapted to use for smooth running over simple pulleys, as, for suspending sliding window sash and other loads. And in addition, it is an important aim to assure the smooth relative pivotal action of any two mutually interlinked links of a chain, notwithstanding that a weld is made in the end of each link. In electrical welding, to insure the maximum strength of the weld, it is customary to bring the joint to the welding temperature and to at the same time subject the butted parts to pressure toward each other whereby a certain amount of the united material is extruded so as to form a collar around the joint, this serving as a reinforcement increasing the strength of the weld so that the weld will not become the weakest place in the chain. In welding oblong links with a joint at the side of the link, if such collar is formed it would make the chain unsuitable for travelling over pulleys, owing to the vibration due to the striking of the collar against the pulley, and also by the increased stresses developed as the result of the jerk imparted when the collar rides on a pulley, as well as the localizing of bending stresses and strains due to the collar resting upon a pulley face. It is therefore an object of the invention to so locate the collar on the link that it will not be in a position where the objections mentioned will be developed. A collar on the side of an elongated link also impairs the free sliding movement of one link within another, and tends to facilitate kinking and entanglement.

The invention includes the location of the weld in the bight at the end of elongated links, and the formation of the collar only on the outer side of the link, so that at the inner side of the link it is perfectly flush and smooth at the joint. Also, the collar is formed on the outer side and extreme end of the link so that it lies clear within other links through an extreme of relative movement of the links, and so can not interfere with free normal movements and is not presented toward pulley surfaces.

In the perfection of a chain suitable for sash suspension, extremely small links must be formed, and while in larger and expensive chains it is practicable to trim off the collar if its removal is required, in small chains for the uses contemplated for my chain the expense of such removal would be prohibitive in cost, if not impossible of execution on account of the small size of the chain. A feature of the invention consists in opposing the extrusion of the fused metal at the joint on the inner side, as the weld is made, and here again ordinary expedients would be objectionable even if the idea of such opposition were conceived, and a further problem is involved in carrying out the idea economically in the extremely small chain and in the multiplicity of operations involved. It is therefore a further aim of the invention to enable the molding and forging of the fused metal at the time of welding in the awkward situation at the end of an elongated narrow small link in a novel way contributing to the simplicity of mechanism and economy of operations in the production of the chain. Heretofore a welded chain of this type could not be made for sliding sash suspension at a price to compete with the commercial figure 8 blank type, and with the metal tape suspensions. The economy of manufacture has also made the chain available for many uses where its cost was before prohibitive.

Additional objects, advantages and features of invention reside in the construction and arrangement of parts and in methods of procedure involved in the production of the invention, as will be understood from the following description and from the accompanying drawing, wherein Figure 1 is an elevation of a section of chain constructed in accordance with the invention.

Figure 1:
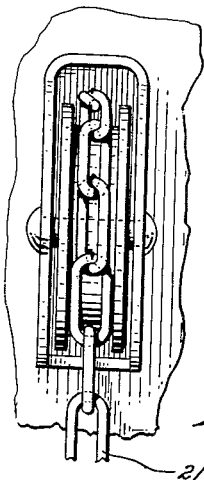
Figure 2:
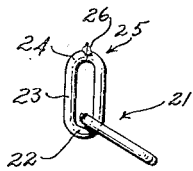
Figure 2 is an enlarged elevation of two of the links.

There is shown a chain 21, which in Figure 1 is actual size of a standard chain much used as a sash suspension and other purposes. In order for this chain to travel effectively over sash pulleys of standard diameter it is made with links of a length and width adapted to pass over the pulleys with a minimum of shock, vibration, noise, or jumping, preferably so as to lie on a pulley face between pulley radii subtending an angle of 50 degrees.

The chain consists of a simple oval link structure formed of wire or rod drawn or otherwise formed of a proper alloy of steel, bronze, or other approved metal. When made of steel it is customarily plated with copper electrically deposited. It is formed from wire blanks cut and bent centrally to produce a bight bend 22, from which respective side bars 23 extend substantially rectilinearly and nearly or quite parallel for a distance, and on the ends of these bars respective semi-bight portions 24 are formed which are butt welded electrically by a suitable apparatus to form a complete bight 25 of the same size and shape as the bight 22. In the welding a collar 26 of the slightly extruded fused metal is formed around the outer part or top of the junction of the wire, but not at the inner side, the wire at that part meeting flush without angularities or projections.

The collar forms a reinforcement of the joint, by which liability of breakage of the weld is minimized, and it is an advantage of locating the weld at the end of the link that the maximum longitudinal stresses to which the chain may be subjected are communicated indirectly to the weld, and it is in shear relation rather than under tensile stress or strain.

The distance to which the collar projects from the symmetrical portion of the wire is not of fixed dimension, but may vary within proper limits. The maximum overall diameter of the collar and link stock body transverse to the major plane of the link should be less than the distance between the side bars, and also the collar projected longitudinally from the link preferably should lie within intersecting tangents from the curve of the semi bights 24 at angles of 45 degrees to the longitudinal axis of the completed link (this limitation is not arbitrary and may be disregarded for some chains). This materially limits the liability of kinking or obstruction of the free movement of the chain over obstructions in case of necessity, and also facilitates the adjustment of the chain in the eye of the usual counter-weight for sliding sash. One standard size of chain made according to the invention for use on ordinary small size sash pulleys is formed with links five-eights of an inch in over-all length, and using wire of fourteen gauge; but these proportions may be varied as required to adapt the chain to various loads and sizes of fittings. The size mentioned, however, is the one most used, and will make apparent the great number of welds required per unit of length of the chain. The over-all width of the link is preferably less than four times the diameter of the wire stock which will prevent two link ends from sliding past each other within a third connecting link, and in the proportions otherwise indicated, contributes to smooth sliding of the chain over angularities as well as pulleys.

This chain may be anchored in sash by any of the devices or expedients heretofore used for securing the old style flat chain, and it is also secured to the sash weight by the use of the devices heretofore employed for attaching the weights to the old style flat chain. But it has a peculiar advantage in permitting the chain to be passed through the eye of the weight, the end link then inserted through another link in the chain beyond the weight, and a fastener engaged therethrough as shown in the said prior application to make a fastening stronger than the chain.

In the production of the chain the wire blanks for the individual links are cut and preformed with the bight 22, bars 23, and semi-bights 24, but the latter are formed with just sufficient excess length to permit the slight extrusion of parts of the butts when fused and the side bars at the same time pressed together into parallelism. The cutting and forming of the links may be accomplished with automatic machinery of suitable design if desired, and as the links are formed, they may also be interlinked so that they are held in chain before welding and as they are moved to the place for welding. In one procedure in carrying out the welding method the chain is advanced with the joint of each link at the advancing end of the link, especially if assembled on the chain at the time of welding. If the links are assembled in a chain as formed before welding the jointed ends may be presented in either direction, but convenience will be best served, and automatic machines would require, that all joints be presented in one direction. The links may be welded by the application of electrodes 50 to each link in succession, or two or more links at a time, one set of electrodes only being illustrated. The electrodes are applied as close to the joint as practicable, and in opposition, at opposite sides of the link, in its major plane, and connected in an electrical circuit of proper potential to fuse the butts when brought into good contact. This is accompanied by sufficient pressure to press the semi-bights together into a good uniting joint having a slight collar. The current used may be either direct current suited to the work, or may be high frequency current if it is desired to take advantage of the counter electromotive force developed in the loop at the opposite part of the link from the weld. The electrodes may be utilized as the pressure means or other means employed, and any desired expedients may be used to limit the straining movement of the preformed link effected during welding.

Figure 3:
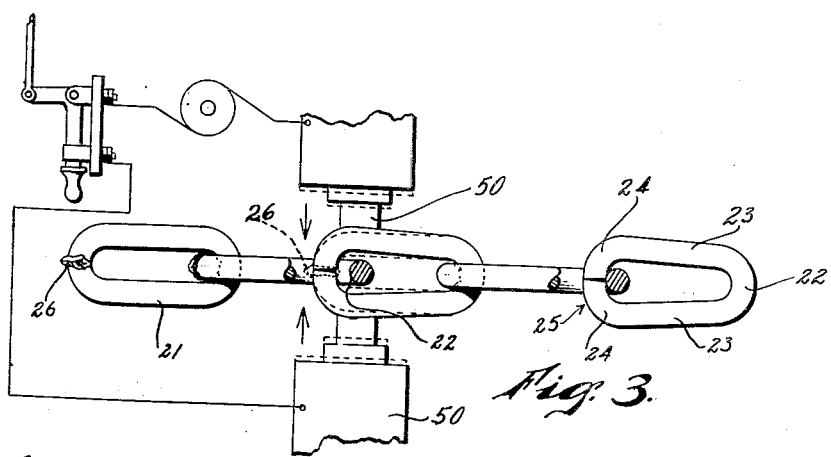
Figure 3 is an elevation of a portion of chain in course of manufacture.
Figure 4:
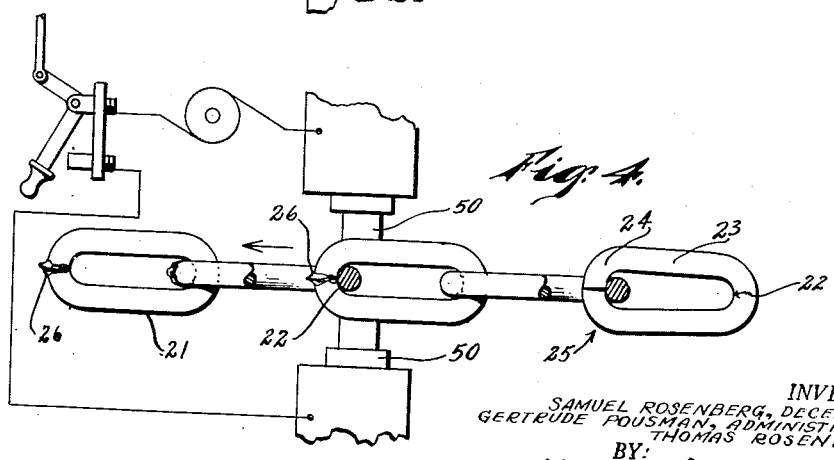
Figure 4 is an enlarged view thereof at a further stage of production.

Under practice heretofore under the invention, when the preformed but uncompleted link to be welded is being positioned between the electrodes, a preceding link welded is adjusted with its bight 25 close to the joint and within the link to be welded but spaced from the joint, the electrodes being constructed or located so as to permit this preceding link to be then or subsequently positioned extending longitudinally from the one being welded in a plane at right angles to the plane of the link being welded, as shown in Figures 3 and 4. As soon as the butted ends 24 are fused, the preceding link is lightly pressed against the joint, serving to forge the joint. Or, it may be held in such position while welding is in progress, as to prevent the protrusion of the metal which tends to become extruded at the inner side of the joint, so that it only extrudes at the outer side of the joint. After the electrodes or other means to compress the sides of the link toward each other have reached the limit of movement desired, the current to the electrodes is interrupted, and the previously welded link may be oscillated to compress and forge the joint at three sides or more, by proper movement of the preceding link in such directions as to compress the collar at the lateral sides as well as at the inner side, to such degree as desired. The desired movement has been produced by swinging the finished chain with a circular movement while adequate tension thereon is maintained. Of course, the joint of a formed but unwelded link yet to be welded may be presented away from the finished chain, and the next unwelded link may have its bight 25 utilized in the same way as before mentioned to forge and shape the joint newly welded. While machinery of various kinds may be utilized for effecting the adjustment of the links between the electrodes, and for positioning the bight of the next link so as to control the shape of the collar of the weld, such machinery is not a part of the invention, and it is therefore not illustrated.

The pressing of the two butts together in the fused state, and the pressing of the bight 22 of the other link against the extruded metal serves as a forging of the material, and in practice the weld has been found of high tensile strength, affording a strong joint. Tests to destruction by tensional stress show failures at other parts of the links than the welds as a rule.

It should be appreciated that the proportions of the links and their shape with respect to the thickness of the wire stock used has a material effect in enabling the production of the chain by the method described. Thus, by limiting the space between the bars 23 as described, the curve in the bight 25 so closely conforms to the curve of the cross section of the bight 22, that when the latter is pulled into engagement with the soft collar portion, the plastic metal is caused to flow principally away from the medial plane of the newly welded link, whereas, if the space between the bars 23 of the link were greater and the bight 25 formed on a considerably greater radius than the relation shown, the soft metal of the collar would be pressed laterally from the bight 22 forming two distinct ridges. Such effect is entirely absent in the chain produced as described.

Another important advantage in the production of the chain as described is derived from the proportioning of the parts as shown and described, consisting in obviating requirement for special manipulation or machine means to properly position the bight 22 with respect to the weld as the bight 22 is drawn thereagainst to forge and shape the weld and collar. A simple longitudinal pull of the completed chain while the newly welded link is held is sufficient to cause the bight 22 to accurately position itself in the bight 25 at the plane of the joint in the newly welded link. The hard stock on the butts at each side of the joint guides the bight 22 to the proper position as the completed link is pulled longitudinally, and prevents distortion of the link. Further, it will be noted that the ends of the butts at the joint are initially so shaped that they contact first at the extreme outer side of the bight 25, and fusing starts there before contact is effected at the inner side of the bight 25. This initiates a flow of metal longitudinally outward of the link as propagation of fusion occurs so that a minimum amount of metal tends to become extruded from the joint at the inner side of the bight 25.

It will be understood that my invention may be applied to use where the corresponding butts of links are soldered, and that the term "weld" in the claims, where consistent includes the joining with solder. It will be appreciated that the invention may be practiced with the use of solder-core wire, with such adaptations or modifications as accord with prior practice.

It is claimed:

1. The method of producing a chain consisting in forming a blank of rod material, bending the same centrally to produce a link bight and two side members to form semi-bights on each of the ends with the butt extremities alined for abutment to form a complete bight opposite the first, positioning another link within and adjacent the joint of the incomplete link thus formed, pressing the butts of the incomplete link together and establishing an electrical circuit through the incomplete link butts across the joint whereby to fuse the metal at the point of contact of the butts, coincidently applying pressure to the sides of the link to move the butts together a distance, and while the fused metal is soft pulling said other link against the collar of extruded metal formed at the joint, while the semi-butts are held together.

2. The method of claim 1 in which the interior of the said bight is bent to a curvature having a radius slightly more than that of the radius of the cross section of the said rod stock.

3. The method of claim 1 in which the circuit is interrupted while said other link is pulled against said joint.

4. The method of claim 1 in which the links are oblong and are formed with an external width within the range of from three to less than four times the diameter of the said rod material, and the said other link is a complete link of the form described permanently assembled in chain with the link being welded, its unwelded bight being drawn longitudinally against the joint of the link being welded.

5. The method of producing chain consisting in forming a blank of rod material, bending the same centrally to produce a link bight, two side members of a link and two semi-bights on each of the ends with butt extremities alined for abutment to form a complete bight opposite the first, whereby a preformed but incomplete link is constituted, coupling a plurality of such links in chain relation with their butts in one direction, welding the butts of the links progressively with advancing of the links and completed chain, and applying a draft force to that part of the chain longitudinally outward of the links as welded in the direction of the welded ends while the material of the weld is still soft.

6. The method of claim 1 in which the blank is formed with end surfaces divergent from each other from the outer part of the bight to be jointed, whereby initial contact will occur there at the outer part of the joint, and whereby a minimum of fused metal is formed at the inner side of the jointed bight.

7. The method of claim 5 in which the completed links are oblong and are formed with an external width within the range of from three to less than four times the diameter of the said material.

THOMAS ROSENBERG.
GERTRUDE POUSMAN,
*Administratrix of the Estate of Samuel Rosenberg, Deceased.*